(12) United States Patent
Hu et al.

(10) Patent No.: US 12,136,716 B1
(45) Date of Patent: Nov. 5, 2024

(54) SYSTEMS AND METHODS FOR SIMULATING OPERATION OF A BATTERY PACK

(71) Applicant: Ansys, Inc., Canonsburg, PA (US)

(72) Inventors: Xiao Hu, Ann Arbor, MI (US); Omkar Champhekar, Evanston, IL (US); Anil Wakale, Pune (IN); Saeed Asgari, Westborough, MA (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 18/450,013

(22) Filed: Aug. 15, 2023

Related U.S. Application Data

(62) Division of application No. 17/177,465, filed on Feb. 17, 2021, now Pat. No. 11,764,419.

(51) Int. Cl.
| | | |
|---|---|---|
| *H01M 10/613* | (2014.01) | |
| *H01M 10/6554* | (2014.01) | |
| *H01M 50/204* | (2021.01) | |

(52) U.S. Cl.
CPC ..... *H01M 10/613* (2015.04); *H01M 10/6554* (2015.04); *H01M 50/204* (2021.01)

(58) Field of Classification Search
CPC .......... H01M 10/613; H01M 10/6554; H01M 50/204
See application file for complete search history.

(56) References Cited

U.S. PATENT DOCUMENTS

2023/0025958 A1* 1/2023 Deng ................... G01R 31/367

* cited by examiner

*Primary Examiner* — Lingwen R Zeng
(74) *Attorney, Agent, or Firm* — Jones Day

(57) ABSTRACT

A system for simulating operation of a battery pack comprising a plurality of battery modules includes an electrical model configured to simulate electrical behavior of a respective battery module and a thermal model configured to simulate thermal behavior of the respective battery module. The electrical model provides outputs coupled as inputs to the thermal model, and the thermal model provides outputs coupled as inputs to the electrical model. A coolant model is configured to couple with the thermal model, the coolant model to simulate cooling of the respective battery module based on a temperature and a heat transfer coefficient associated with the respective battery module.

20 Claims, 18 Drawing Sheets

802

SYSTEMS AND METHODS FOR SIMULATING OPERATION OF A BATTERY PACK

CROSS-REFERENCE TO RELATED APPLICATION

This application is a divisional of U.S. patent application Ser. No. 17/177,465, filed Feb. 17, 2021, which is incorporated herein by reference in its entirety.

BACKGROUND

The global demand for batteries is expected to grow exponentially in coming years. Much of this demand is likely to be driven by the electrification of transport, which is expected to account for the majority of battery demand ten years from now, in terms of total energy storage capacity. This energy storage requirement drives demand for larger and larger battery configurations, such as battery packs with more battery modules, each respective battery module often including a larger number of battery cells.

SUMMARY

Systems and methods are provided for simulating operation of a battery pack comprising a plurality of battery modules, each battery module comprising a plurality of battery cells. The method simulates operation of the plurality of battery modules. Simulating operation of a particular battery module includes simulating electrical behavior of respective battery cells of the battery module using an electrical model, simulating electrical behavior including providing outputs indicative of operation of respective battery cells of the battery module, and simulating thermal behavior of respective battery cells of the battery model based on outputs of the electrical model using a thermal model, where simulating thermal behavior including comprises providing outputs indicative of operation of respective battery cells of the battery module, where simulating electrical behavior is based on said outputs of the thermal model. A heat dissipation input is provided to respective thermal models using a coolant model configured to simulate cooling of the battery modules based on a temperature and a heat transfer coefficient associated with respective battery modules.

As another example, a system for simulating operation of a battery pack comprising a plurality of battery modules includes an electrical model configured to simulate electrical behavior of a respective battery module and a thermal model configured to simulate thermal behavior of the respective battery module. The electrical model provides outputs coupled as inputs to the thermal model, and the thermal model provides outputs coupled as inputs to the electrical model. A coolant model is configured to couple with the thermal model, the coolant model to simulate cooling of the respective battery module based on a temperature and a heat transfer coefficient associated with the respective battery module.

As a further example, a method of simulating operation of a battery pack includes performing thermal simulation of a battery module comprising a plurality of battery cells, the thermal simulation computing temperature values at a plurality of locations within respective battery cells of the battery module as thermal results. The thermal results are used to generate a reduced order thermal model for the battery module, the reduced order thermal model comprising a state space model that provides temperature outputs associated with respective battery cells of the battery module based on past and current heat inputs associated with the respective battery cells. Outputs of the thermal model are connected to inputs of an electrical model, outputs of the electrical model are connected to inputs of the thermal model, and a coolant model is connected to inputs of the thermal model and other thermal models associated with other battery modules of the battery pack. Operation of the battery pack is simulated by operating respective thermal models and electrical models of the battery module and other battery modules.

DETAILED DESCRIPTION

Figure 1:
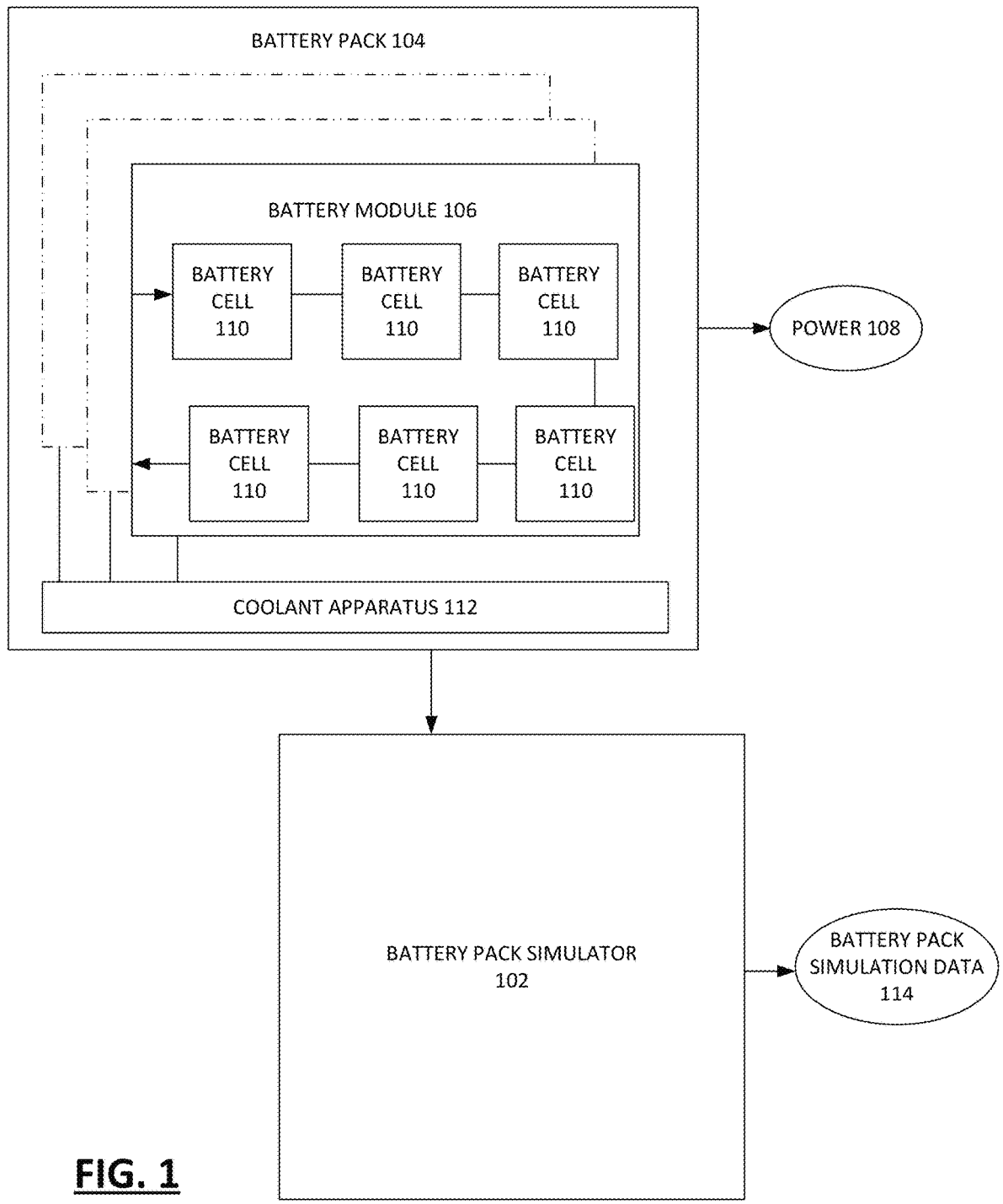
FIG. 1 is a diagram depicting a system for simulating operation of a battery pack comprising a plurality of battery modules.

As noted above, it is anticipated that demand for larger battery packs, which are able to store larger amounts of power, to increase dramatically in coming years. Large battery packs (e.g., multi-module battery packs for electric vehicles) typically produce significant amounts of heat, such that battery pack simulation, including thermal simulation, is desirable. But the complexity of battery packs, particularly battery packs comprising significant numbers (e.g., 4 or more) of component battery modules, often makes time efficient simulation using physics based methods (e.g., real time simulation, simulation in less than 1 minute, in less than one hour) infeasible. For example, the amount of processing necessary to provide robust thermal simulation of temperatures for a multi-module battery pack using computational fluid dynamics (CFD) may be too computationally expensive and thus infeasible to be adopted in the design process (e.g., in a design process demanding real time performance).

As described herein, reduced order models may be used to speed simulation processing and decrease simulation time, often dramatically such that real time or near real time (e.g., simulation with less than thirty seconds lag per minute) is achievable. A reduced order model (ROM) is a simplification of a high-fidelity, complex source model. ROMs may be created that capture the behavior (i.e., outputs based on inputs) of these source models within an operating range while simplifying the processing required to provide that behavior. For example, a ROM in the form of a state space model may be created to calculate outputs based on inputs to the model within an expected range of operation for the object being modeled. The ROM may be designed to simulate behavior of the object being modeled in a targeted range of operation (e.g., in normal operation, in a specific exception condition) to provide simulation output data at a specified granularity and accuracy. While the more robust source model may be able to provide more simulation data and simulation data for a wider range of scenarios (e.g., many exception conditions), when a ROM is well matched for the simulation need, it can provide significant simulation speed benefits.

To create a ROM, input/output relationships of the system are analyzed, typically using the high-fidelity source model. That source model may be executed multiple times across different sets of inputs to determine outputs of the source model. For example, the source model may be operated many ($10s$, $100s$) of times using different inputs that would be expected to be received by the object in the ROM's targeted range of operation. The source model's outputs together with the associated inputs are then processed to create the desired ROM, which could in turn be used to determine outputs based on the provided inputs. And the inputs provided to the ROM are not limited to the inputs used to create the ROM. For example, a ROM that is modeling temperature of a battery pack based on current and past heat generated at each battery cell may be generated by providing sample battery cell heat inputs to the source model to generate output temperature values at each battery cell. The ROM may then be created based on those heat inputs and temperature outputs such that an average temperature value for each battery cell is output by the ROM. The ROM is realized as a state space model that provides single temperature values for each battery cell based on current and past heat inputs (e.g., received from a different data source such as a different model as described herein). The time scale for which past heat inputs influence a current temperature output may be estimated from the impulse response. Such a time scale describes the memory of the ROM (e.g., the temperatures at the battery are not influenced by things that happened at the battery more than two hours ago). Such time scale information is contained in the outputs created from the high fidelity source model. The ROM, created from such outputs, will therefore correctly model the memory effort of temperature.

Systems and methods as described herein provide for interaction among a thermal ROM that models thermal behavior of a portion of a battery pack (e.g., a battery module) and other models that simulate other behaviors of that battery pack. In one example, the thermal model associated with a battery module interacts with an electrical model configured to simulate electrical behavior of the respective battery module. The electrical model provides heat outputs that indicate amounts of heat generated by the battery module based on current operation (e.g., based on commanded output voltage/current, present temperature(s) at the battery module). Those outputs are provided as inputs to the thermal model that is configured to simulate thermal behavior of the respective module, including providing temperature output(s) at one or more locations of the battery module based on the heat inputs received from the electrical model and, in embodiments, one or more other inputs. For example, the thermal model may further interact with a coolant model (e.g., representative of a cooling plate on which multiple battery modules would be placed in a physical embodiment of the modeled system). The coolant model simulates cooling of the respective battery module based on parameters such as an ambient temperature and a heat transfer coefficient, as described further herein.

FIG. 1 is a diagram depicting a system for simulating operation of a battery pack comprising a plurality of battery modules. A battery pack simulator 102 receives input data associated with a battery pack 104 whose operation is to be simulated. The input data may comprise characteristics of a battery pack that has been designed and manufactured or of a battery pack that is currently in the design phase. The battery pack 104 includes a plurality of battery modules 106 that are connected to one another to provide power 108, such as for powering apparatuses (e.g., in a home, office, or job site), transportation vehicles (e.g., a car, airplane, boat, amphibious vehicle), or other electrically powered device. Each battery module 106 includes a plurality of battery cells 110 (e.g., 10 battery modules having 20-30 battery cells each) that are interconnected, in series or parallel, so as to provide desired power output (e.g., at a desired voltage level, a desired current level). The battery cells 110 of the battery pack 104 typically generate heat in transforming chemical energy (e.g., chemical potential energy stored in the battery cells 110) into electrical energy. To prevent overheating, which could cause damage to the battery pack 104 and surrounding structure, the battery modules 106 are connected to a coolant apparatus 112. In embodiments, the coolant apparatus 112 takes the form of a cold plate on which the battery modules 106 are placed. In that example, the cold plate circulates coolant through the cold plate from positions near the battery modules 106 to a heat exchange point, such as where the coolant is exposed directly or indirectly to an outside cooling provider, such as ambient air. The amount of cooling that the cold plate is able to provide the battery modules 106 may, in embodiments, be based on a characteristic of the cooling provider (e.g., the ambient air temperature) and a flow rate of the coolant in the cold plate.

The battery pack simulator 102 receives the characteristics of the battery pack 104 to be simulated and provides battery pack simulation data 114. The battery pack simulation data 114 may take a variety of forms, sometimes as controlled by a user operating the battery pack simulator 102. For example, the battery pack simulation data 114 may provide temperature data, such as average temperature data across battery modules 106, peak temperature data at individual battery modules, or identification of battery cells 110 that meet a condition, such as exceeding a user-defined threshold temperature indicative of overheating in the battery pack 104.

Figure 2:
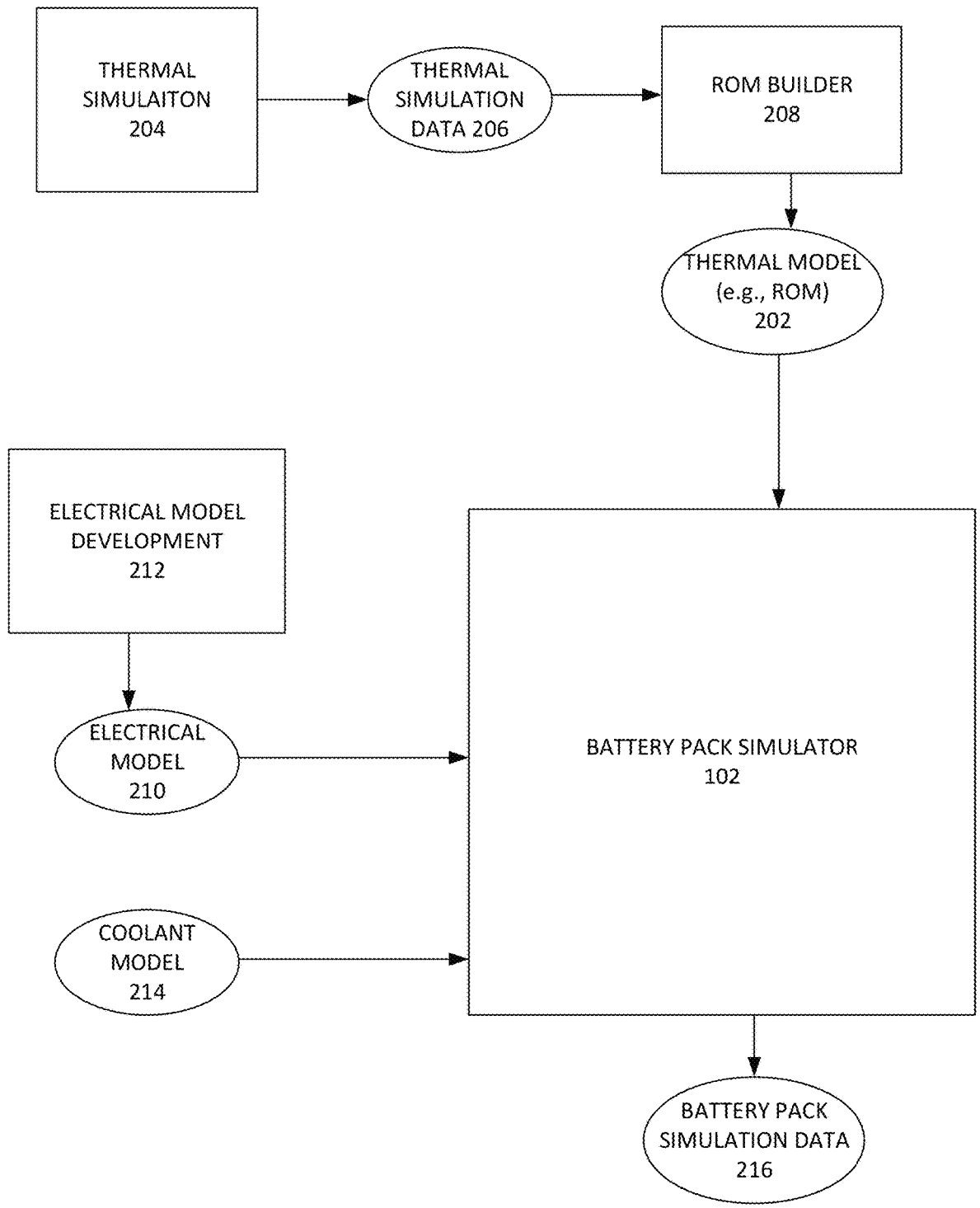
FIG. 2 is a diagram depicting example components generated, provided to, and utilized by a battery pack simulator.

FIG. 2 is a diagram depicting example components generated, provided to, and utilized by a battery pack simulator. As described above, the battery pack simulator may utilize a thermal model in the form of a thermal ROM 202. A thermal ROM 202 may enable fast processing of thermal simulation of operation of the battery pack that mimics simulation that would be provided by a more robust high-fidelity source model. In one example, thermal simulation is performed at 204 using a source model (e.g., a high fidelity CFD model), as described above, to form thermal simulation data 206. That thermal simulation data 206 is provided to a ROM builder 208 to generate the thermal model 202 in the form of a ROM. In one example, the source model 204 is used as a component in a design of experiments operation (e.g., using Ansys DesignXplorer) to determine a series of design points to be tested using the source model. The ROM builder 208 uses the thermal simulation data 206 across multiple simulation runs to predict the response of simulation using the source model 204 between simulation runs, adjusting weighting factors between runs to minimize error as described further herein.

The battery pack simulator 102 also operates using an electrical model 210 that is developed at 212. In one example, the electrical model 210 is developed using an equivalent circuit model approach. In that approach, each battery cell of a battery module is represented as an analog circuit that includes an internal resistance indicative of heat generation at that battery cell. That heat generation is dependent on one or more factors that may include a current temperature at which the battery cell is operating and an amount of current that is being drawn from the battery cell, and/or other factors (e.g., a current charge level of the battery cell), to provide an amount of current being drawn. In one example, the electrical model 210 receives one or more inputs that indicate current temperatures at a battery module (e.g., a temperature at each battery cell of the module) and outputs one or more outputs that indicate current heat output by the battery module (e.g., an amount of heat output at each battery cell of the module).

In the example of FIG. 2, the battery pack simulator 102 further utilizes a coolant model 214 in simulating operation of the battery pack. In one example (e.g., where the coolant model 214 is representative of cold plate positioned near or on which the battery modules sit, the coolant model 214 may take the form of a lookup table containing values associated with heat transfer coefficients (HTCs) associated with different localities on the cold plate. As described further herein, each cold plate position (i.e., each position where one of N battery modules sits (e.g., N=12)) has a base HTC value in the lookup table. In operation, those base HTC values from the lookup table may be adjusted (e.g., by a factor that is a function of position) based on a coolant flow rate as specified in the simulation and applied in providing a coolant input to the respective thermal model 202 associated with that cold plate position.

Figure 3:
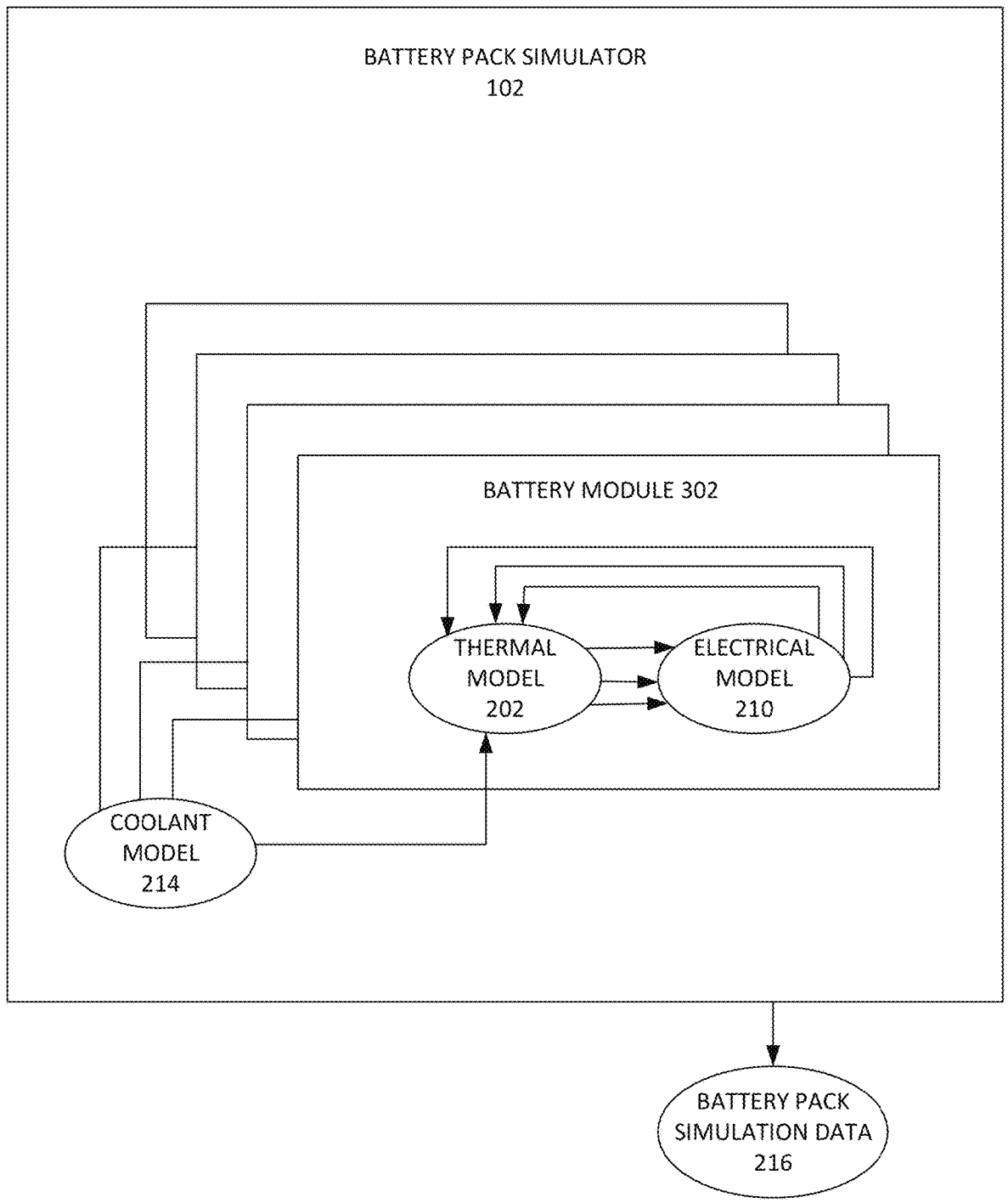
FIG. 3 is a diagram depicting example interactions of a thermal model, electrical model, and a coolant model.

The battery pack simulator then utilizes instances of the thermal model 202, the electrical model 210, and the coolant model to simulate operation of the battery pack to generate battery pack simulation data 216. FIG. 3 is a diagram depicting one example of interactions of a thermal model, electrical model, and a coolant model. The battery pack simulator 102 accesses the thermal model 202, the electrical model 210, and the coolant model 214 to simulate operation of a battery pack comprising a plurality of battery modules to produce battery pack simulation data 216. For a respective battery module 302, the electrical model 210 is configured to simulate electrical behavior, and the thermal model 202 is configured to simulate thermal behavior of the respective battery module. The electrical model 210 provides outputs used as inputs to the thermal model 210, and the thermal model provides outputs used as inputs to the electrical model 210. The coolant model 214 is coupled with the thermal models 202 of the respective battery modules 302 to simulate cooling of the respective battery modules 302 based on variables such as an ambient temperature at an inlet of the coolant module and heat transfer coefficients associated with battery modules.

Figure 4:
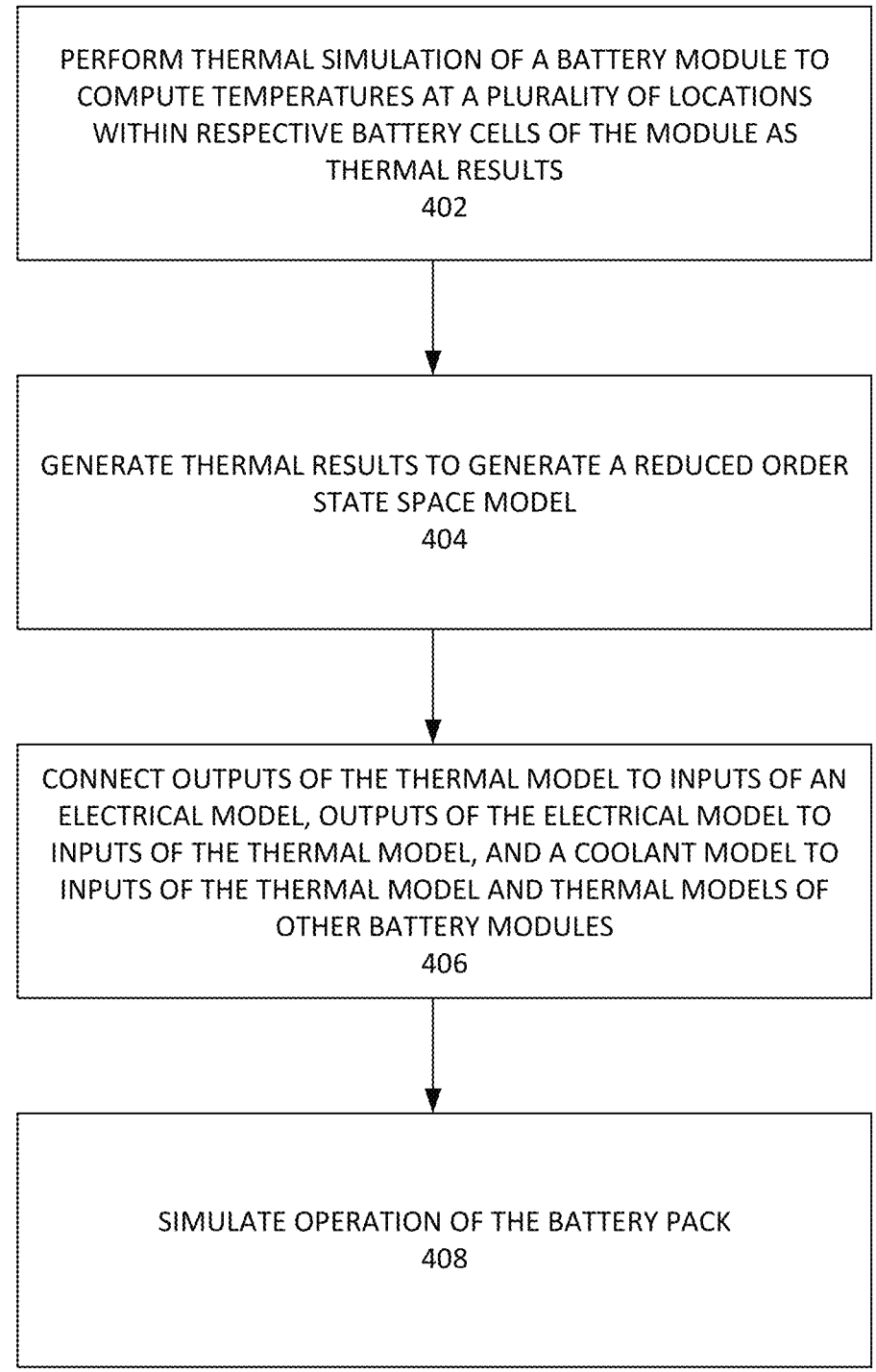
FIG. 4 is a flow diagram recapping set up and operation of an example battery pack simulator.

FIG. 4 is a flow diagram recapping set up and operation of an example battery pack simulator. At 402, thermal simulation of a battery module comprising a plurality of battery cells is performed, the thermal simulation computing temperature values at a plurality of locations within respective battery cells of the battery module as thermal results. At 404, the thermal results are used to generate a reduced order thermal model for the battery module, the reduced order thermal model comprising a state space model that provides temperature outputs associated with respective battery cells of the battery module based on past and current heat inputs associated with the respective battery cells (e.g., a user commands a system to perform a design of experiments operation to perform thermal simulation at 402 to compute the thermal results and to use those thermal results to generate the reduced order thermal model). At 406, outputs of the thermal model are connected to inputs of an electrical model, outputs of the electrical model are connected to inputs of the thermal model, and a coolant model is connected with all battery modules of the battery pack (e.g., a user uses a graphical user interface to configure a simulation by connecting the thermal model, the electrical model, and the coolant model as described). At 408, operation of the battery pack is simulated by operating respective thermal models and electrical models of different battery modules and the coolant model for the entire pack (e.g., a user commands a system to execute a simulated operation of the battery pack as represented by the connected thermal models, electrical models and the coolant model). In an embodiment, the process of FIG. 4 is using a computer-readable medium encoded with software instructions for commanding one or more data processors to execute the described steps.

Figure 5:
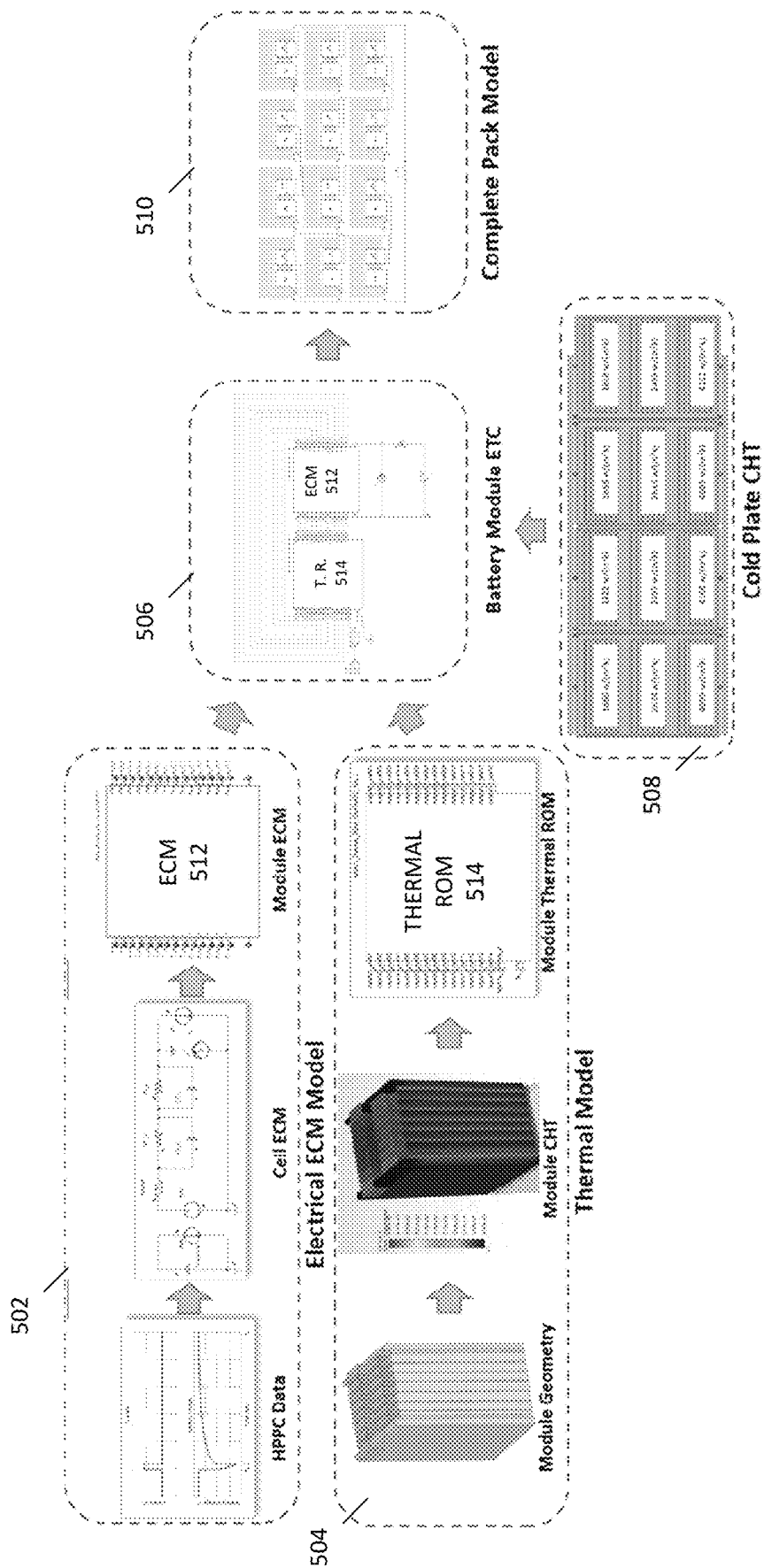
FIG. 5 is a diagram depicting example generation of electrical and thermal models as well as integration of electrical models, thermal models, and a coolant model.

FIG. 5 is a diagram depicting example generation of electrical and thermal models as well as integration of electrical models, thermal models, and a cold plate model. At 502, as described further herein, an electrical model configured to simulate electrical behavior of a respective battery module is generated. At 504, a thermal model configured to simulate thermal behavior of the respective battery module is generated. At 506, an electrical model (e.g., one generated at 502) and a thermal model (e.g., one generated at 504) are interconnected to simulate behavior of the respective battery module, where the electrical model 512 provides outputs used as inputs to the thermal model 514, and the thermal model 514 provides outputs used as inputs to the electrical model 512. The combination of the electrical model 512 and the thermal model 514 is configured to simulate electrical and thermal behavior of the respective battery module. At 508, a coolant (e.g., cold plate) model is generated and connected to the thermal model 514 of the respective battery module thermal models.

In the example of FIG. 5 and as further described herein, the coolant model 508 is simulating a cold plate on which battery modules are positioned, where the example of FIG. 5 depicts positions for 12 battery modules. As depicted, a base heat transfer coefficient is associated with each cold plate position. In some implementations, the coolant model 508 is implemented as a look up table, each cold plate position being associated with a base heat transfer coefficient. A cold plate is typically more efficient at providing cooling at some battery module positions than others. For example, the cold plate may provide more efficient cooling for those modules closer to the inlet manifold of the cold plate. In the example of FIG. 5, the inlet manifold is located near the left of the cold plate, such that battery modules placed near the left are cooled more efficiently than battery modules further from that point, such as to the right. This is exemplified by battery module positions near the left position having higher heat transfer coefficients than those battery module positions closer to the right position.

As noted above, the coolant model is connected to thermal models (e.g., thermal model 514) associated with different battery modules. The electrical model 512/thermal model 514 pairs associated with each battery module are then connected to one another at 510 to represent a battery pack for simulation. For example, a sufficient number of battery modules may be connected in series to provide a desired output voltage from the battery pack.

Figure 6:
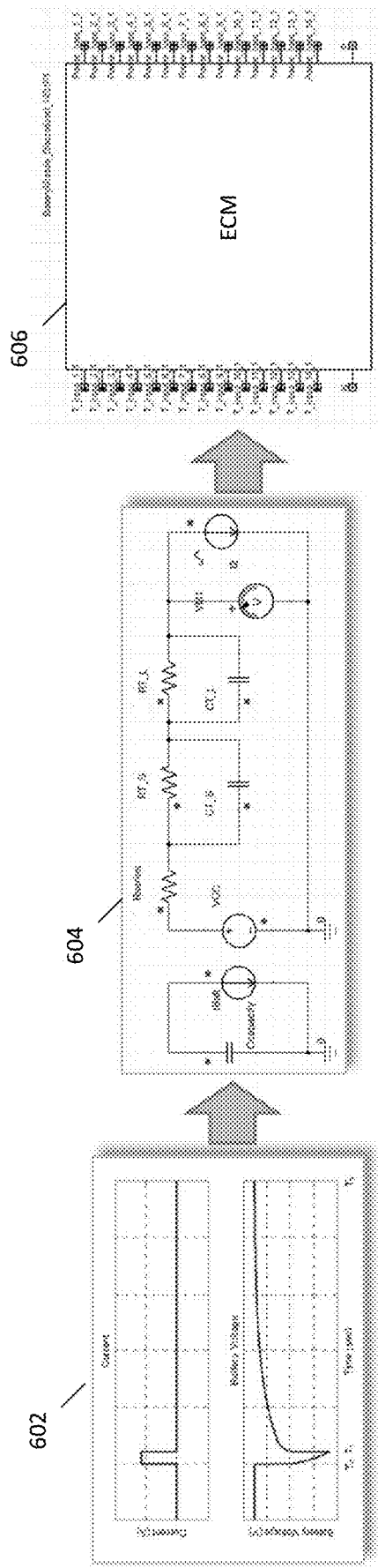
FIG. 6 is a diagram depicting an example process for generating an electrical model.

FIG. 6 is a diagram depicting an example process for generating an electrical model. At 602, hybrid pulse power characterization test data is acquired at different levels of state of charge and temperature for a battery. At 604, that information is used to develop a cell-level battery equivalent circuit model with associated parameters that characterize how a battery cell behaves based on factors such as its level of charge, its temperature, and its commanded output. In embodiments, a cell heat generation value may be extracted from observation of operation the cell equivalent model. The battery module level circuit model is then generated at 606 by combining battery cell equivalent models from 604 based on characteristics of the battery module to be simulated. For example, a circuit model 606 for simulating operation of a battery module having 14 battery cells would utilize 14 equivalent models from 604. In the example of FIG. 6, the circuit model 606 includes 14 inputs, one for each battery cell being simulated, each of those inputs being associated with a respective battery cell temperature (e.g., a battery cell temperature received from a thermal model as described further herein). The circuit model 606 further includes 14 outputs, one for each battery cell being simulated. Each of those inputs is associated with a cell heat generation value extracted by observation of a cell equivalent model associated with a respective battery cell.

Figure 7:
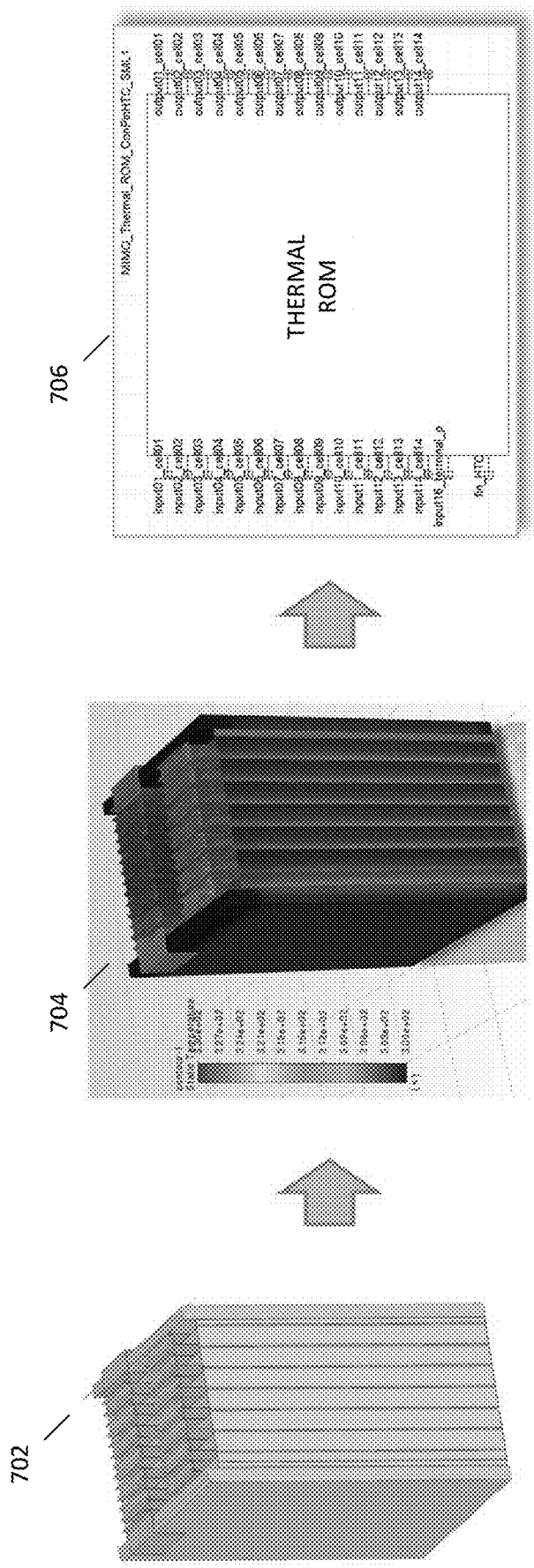
FIG. 7 is a diagram depicting an example process for generating a thermal model.

FIG. 7 is a diagram depicting an example process for generating a thermal model. At 702, battery module geometry is received. In this example, the battery module includes 14 battery cells arranged in one row. At 704, operation of the battery module is simulated under a variety of different operating conditions. That simulation may be performed using a high-fidelity computational fluid dynamics source model that is commanded to operate according to a variety of scenarios within a target field of operation for the battery module. Simulation using the source model provides data regarding temperatures within the battery module (e.g., volume averaged temperature for each of the 14 cells of the battery module). Results from the simulation of the source module are used to generate the thermal model at 706, which takes the form of a thermal ROM.

In one example, the results from the source model at 704 are provided to the ROM builder at 706. The ROM builder at 706 generates a state space model that outputs temperature values associated with individual battery cells based on heat value inputs associated with those individual battery cells (e.g., as would be received from a circuit model as described herein). The ROM builder optimizes parameter values of the state space model based on heat value inputs and temperature value outputs calculated from the source model simulation received from 704. The optimization process within the ROM builder is to minimize error between the ROM temperature outputs based on a current set of heat inputs compared to temperature outputs from the source model. The iterative ROM building process may be repeated automatically at a preset number of times or until a predetermined criteria is met (e.g., error falling beneath a preset threshold).

Figure 8:
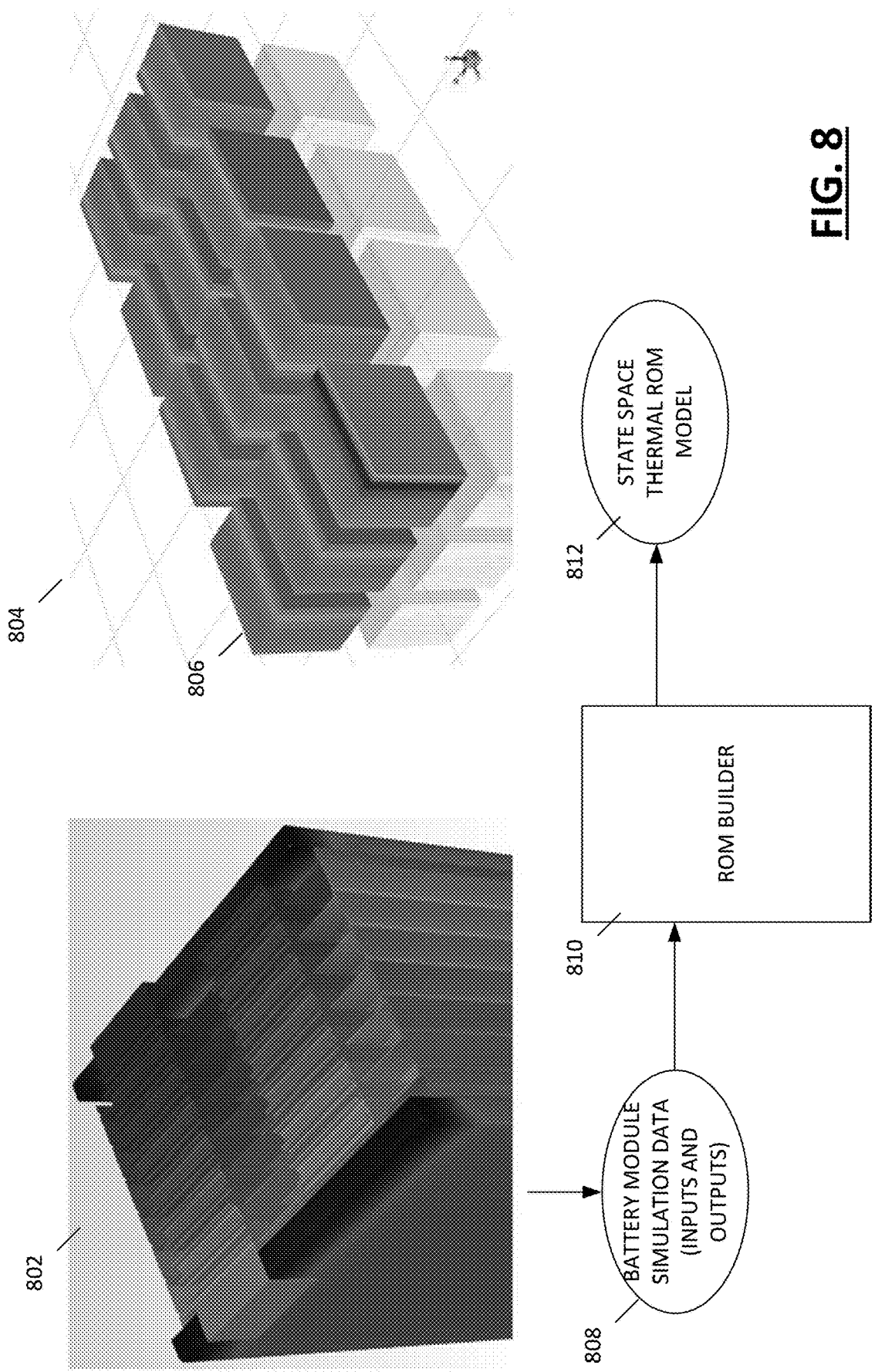
FIG. 8 is a diagram depicting ROM generation using a simplification operation.

To streamline ROM creation (e.g., in both memory size and creation time aspects), in embodiments, ROM outputs may be a subset of outputs generated by a higher-fidelity source model. As noted above, a source model may generate many thousands or millions of temperature readings at different positions within each battery cell. Prior to being received at a ROM builder, a subset of those many temperature values will be used. For example, the many temperature values for a battery cell may be simplified to an average temperature value for a cell, an average temperature value at an area of interest, a temperature at the center of a battery cell (e.g., at a battery cell component that is susceptible (most susceptible) to temperature related failure). The ROM then uses the source model simulation input/output results (e.g., per cell heat and temperature values) to generate the ROM, which could then be used to calculate the simplified outputs (e.g., per cell average temperature) given inputs. FIG. 8 is a diagram depicting source model results versus ROM results. At 802, high-fidelity computational fluid dynamics simulation is performed on the battery module using a source model based on per-cell heat input values. At 804, the many temperature values associated with each battery cell are simplified to a single per cell temperature value per cell, as indicated at 806, where each of 14 battery cells within a module is associated with a single temperature value associated with that cell, as represented by the differing color values there. At 808, the battery module simulation data (e.g., the 14 per-cell heat input values varying over time, the 14 per-cell temperature values varying over time) are provided to the ROM builder 810, which uses the data to optimize its ROM model parameter values so as to minimize error between its 14 per-cell temperature values and the 14-per-cell temperature values output provided by the source model at 808. After the optimization process, the state space thermal ROM model is output from the ROM builder at 810, where that ROM mimics operation of the high fidelity source model, but operates much faster (e.g., in real time) as facilitated by factors such as a limited target operation space and simplified outputs (e.g., single per-cell temperature output versus many per cell).

Figure 9A:
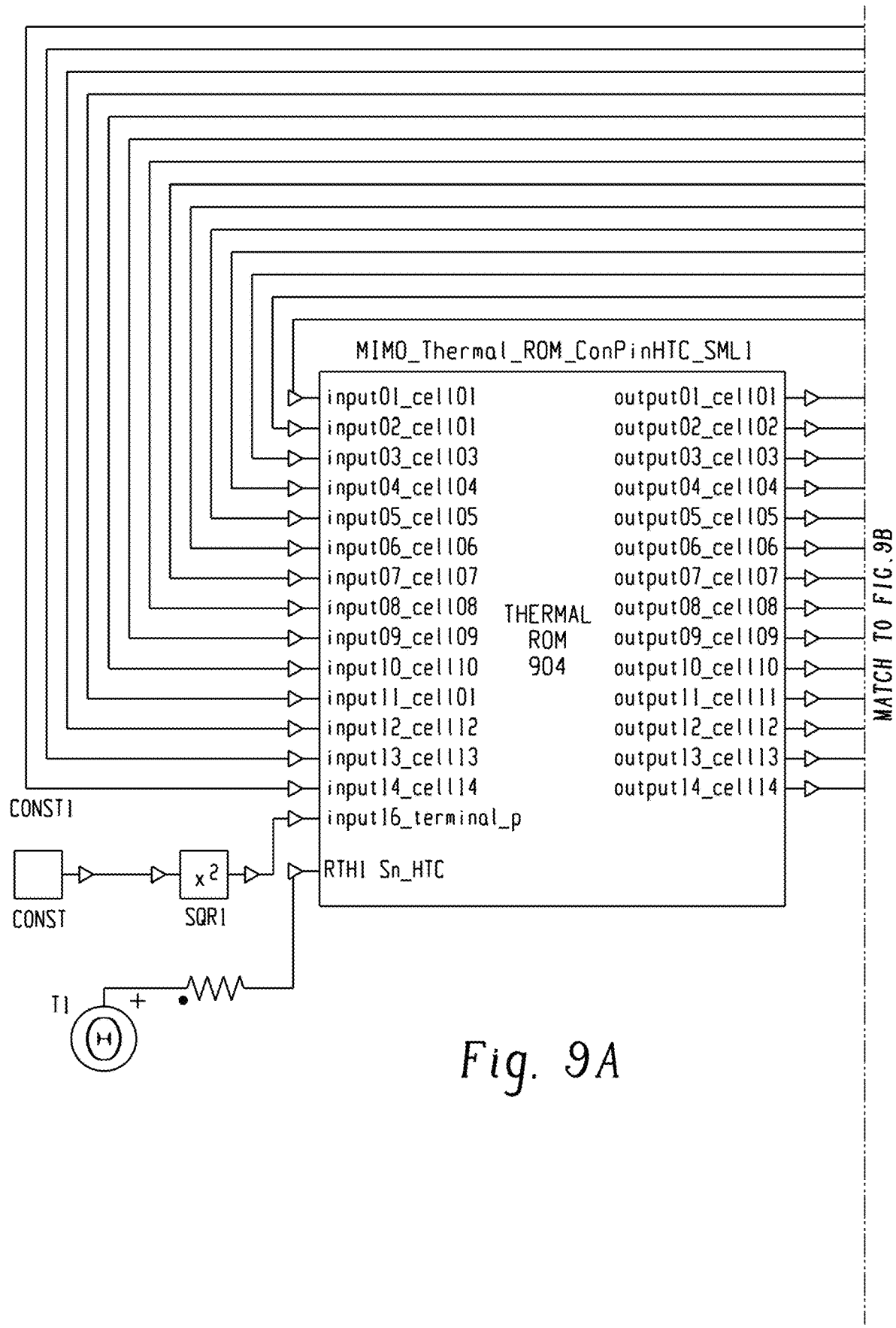
FIG. 9 is a diagram illustrating interconnection of an electrical model and a thermal model.
Figure 9B:
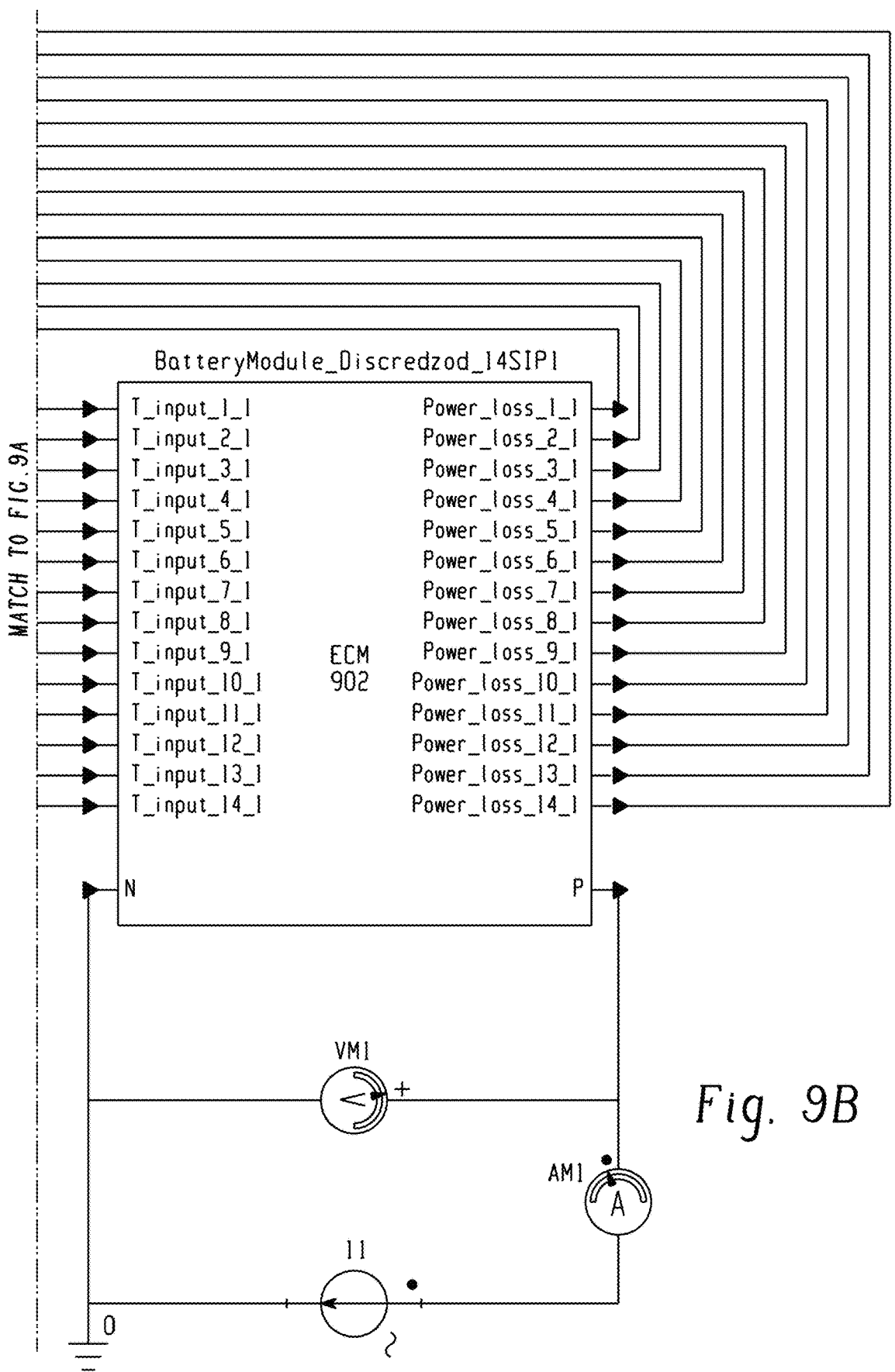

Once the electrical model and the thermal model are generated, they can be connected such that they, in combination, simulate electrical and thermal behavior of a battery module. FIG. 9 is a diagram illustrating interconnection of an electrical model and a thermal model. The electrical model 902 receives inputs on its 14 input pins from the thermal model (ROM) 904. Each input is associated with a temperature at one of the 14 battery cells of the battery module being simulated as determined by the thermal model. Based on factors such as one or more of that input temperature data, the current charge state of battery cells, and commanded output of the battery cells, the electrical model 902 provides 14 outputs on its output pins. Each output is associated with a heat generated at one of the 14 battery cells of the battery module. Those per-cell heat values are routed to inputs of the thermal model 904. That thermal model uses those per-cell heat values to determine a temperature value for each cell of the battery module, with those 14 temperatures being output from the 14 outputs of the thermal model 904 for coupling back to the electrical model 902. In this way, the effect of per-cell temperatures from the thermal model are represented in heat generation outputs from the electrical model, and the per-cell heat generation outputs from the electrical model are represented in temperature outputs from the thermal model. As described further herein below, the thermal model 904 is further receives a signal from the coolant model to simulate cooling of the battery module, such as via a cold plate. Using that coupling, the thermal model 904 may reduce its temperature output values that is a function of the amount of cooling indicated by the model at 906.

Figure 10A:
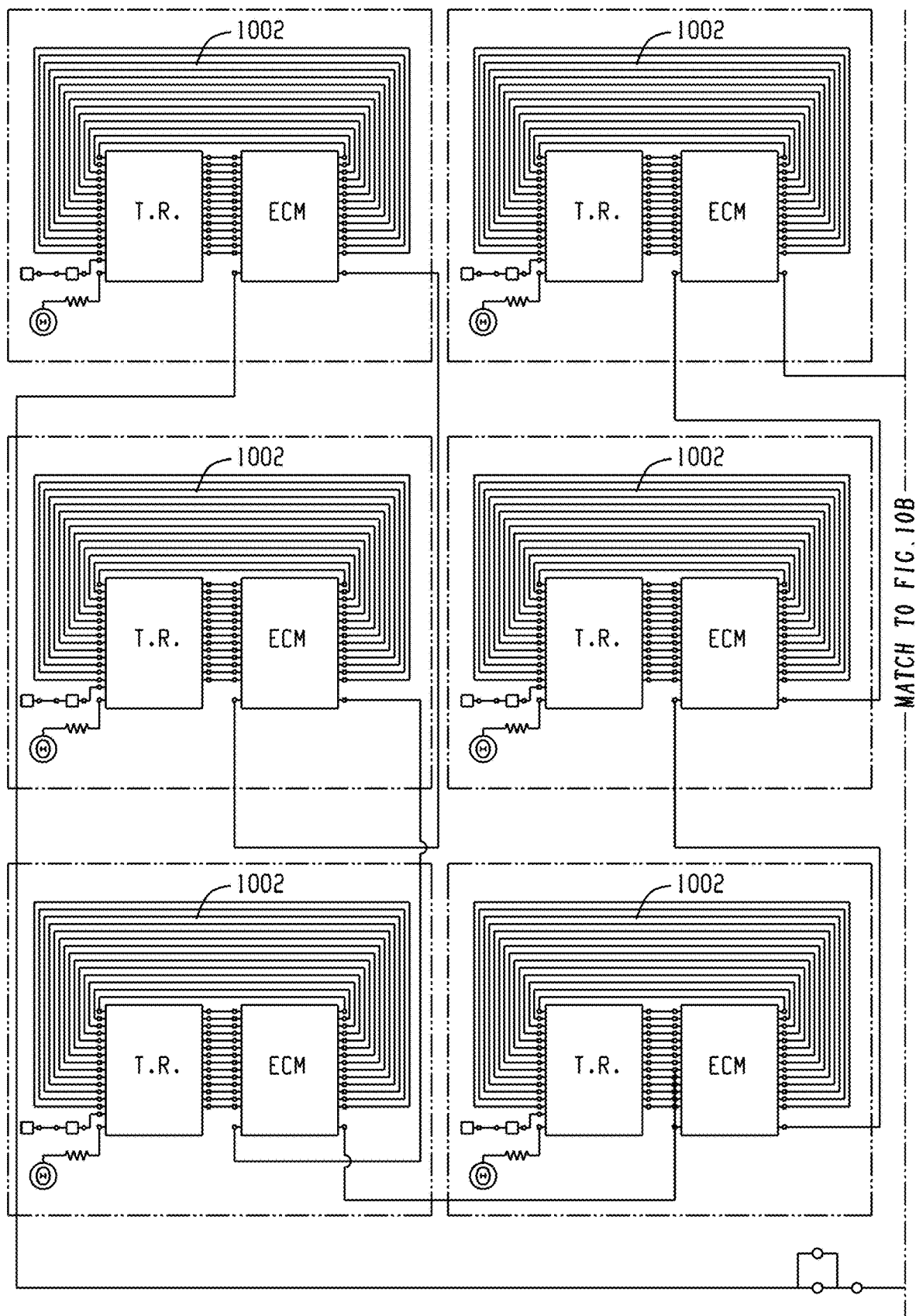
FIG. 10 is a diagram depicting connection of twelve sets of electrical/thermal models to form a simulated battery pack.
Figure 10B:
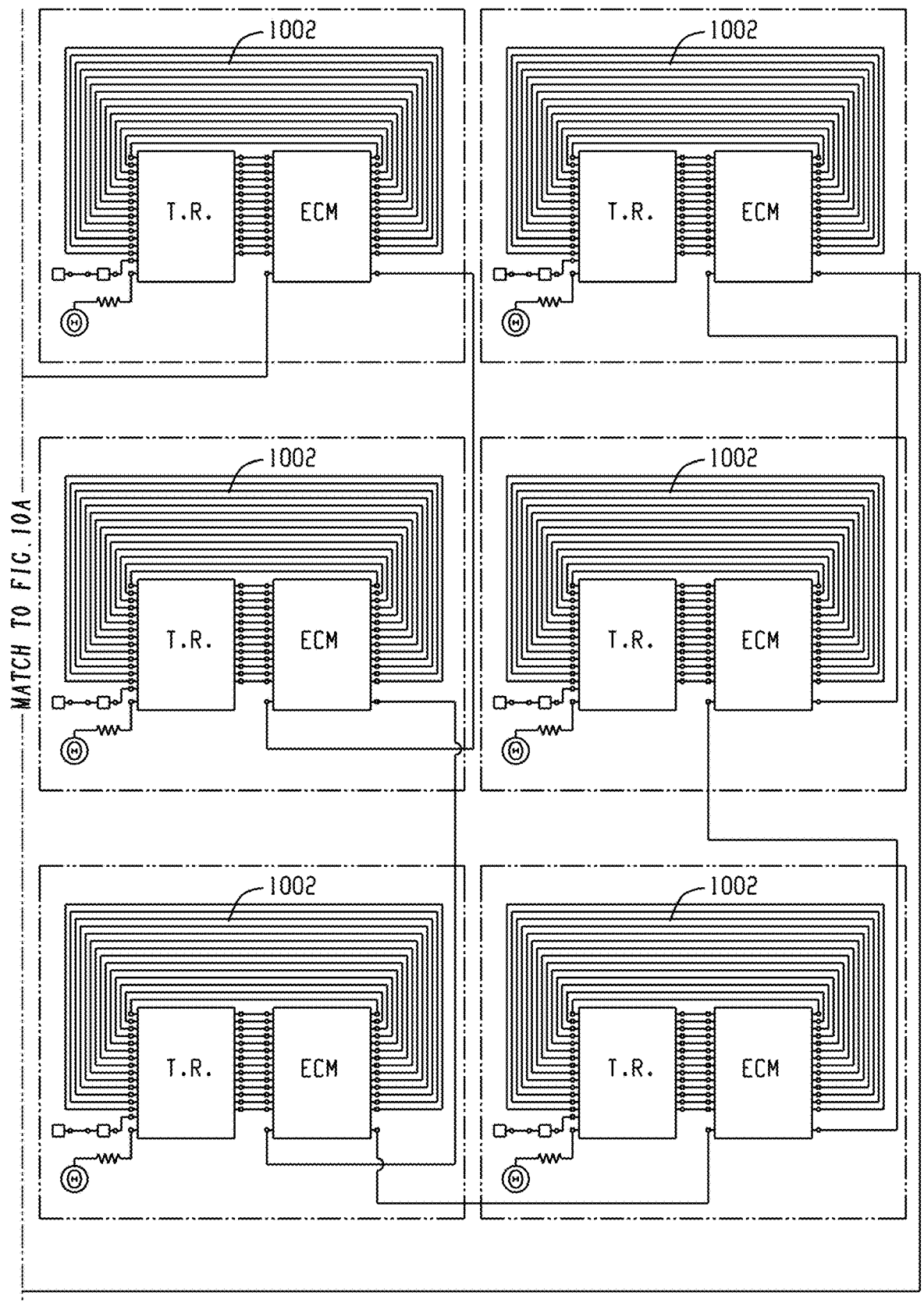

Once electrical and thermal models are interconnected to represent individual battery modules, those combined battery module structures can be connected to represent thermal and electrical behavior of the battery pack. FIG. 10 is a diagram depicting connection of twelve sets of electrical/thermal models to form a simulated battery pack. Each battery module is represented by an interconnected electrical model and thermal model, as contained in each of the dashed boxes labeled 1002. Electrical models across the battery modules are connected in series to account for battery modules being connected in series to produce a desired output voltage for the battery pack. The output voltage and current, and thus power output, of the battery pack are measured at 1006 by a current meter and voltage meter positioned between a first battery module of the battery pack and a final battery module of the battery pack in the serial arrangement.

Figure 11:
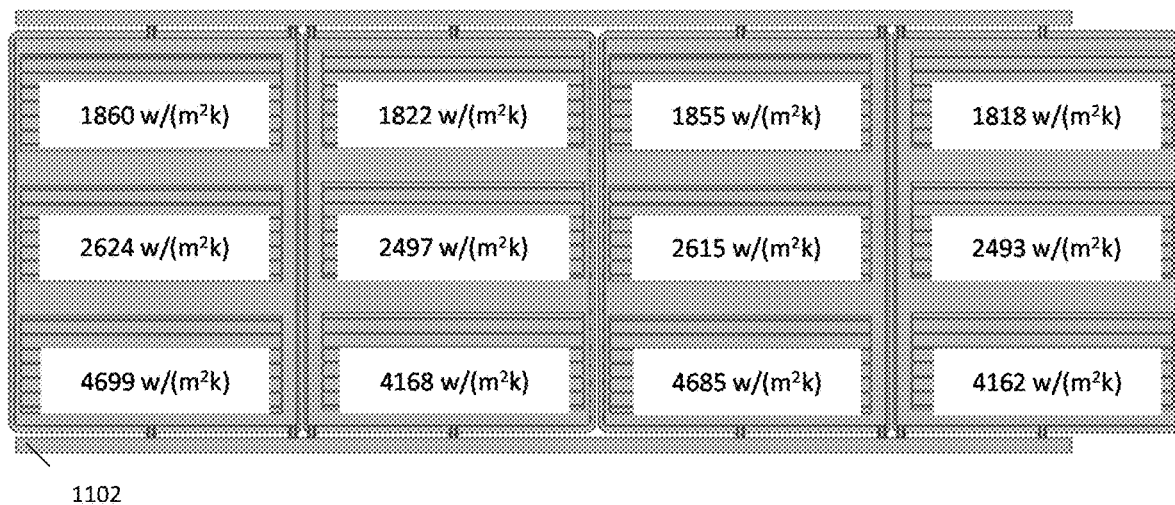
FIG. 11 is a visualization of a coolant model representing a cold plate.

As noted above, the thermal models associated with the plurality of battery modules of the battery pack being simulated are connected to the coolant model. FIG. 11 is a visualization of a coolant model representing a cold plate. The cold plate includes 12 positions, one for each of the battery modules in a 12-module, 14 battery-cell-per-module battery pack. The diagram of FIG. 11 identifies one base heat transfer coefficient, in units of watts per meter-squared-kelvin. In practice, these base heat transfer coefficients may be stored as a lookup table data structure. As noted above, cooling efficiency is not uniform across an entire cold plate. In the example of FIG. 11, coolant is entering the cold plate at 1102. The coolant then traverses the cold plate in serpentine fashion, going from bottom to top, before leaving the cold plate at point 1102. Cooling efficiency diminishes along that path such that battery module positions later in the path have a lower base heat transfer coefficient that those earlier in the path. This is illustrated by modules near the bottom having a base heat transfer coefficient of approximately 4500 w/(m$^2$k), while the modules near the top only have a base heat transfer coefficient of approximately 1850 w/(m$^2$k).

During a simulation run, the base heat transfer coefficient values located in the coolant model lookup table may be adjusted before being used to simulate cooling of battery modules. In one example, the coefficients are adjusted based on a coolant flow rate within the cold plate. For example, when coolant flow rate is increased, the coefficients associated with all of the battery module positions are increased. The amount of increase is a function of the position and the flow rate increase. Conversely, when coolant flow rate is decreased, the coefficients associated with all of the battery module positions are decreased.

Figure 12:
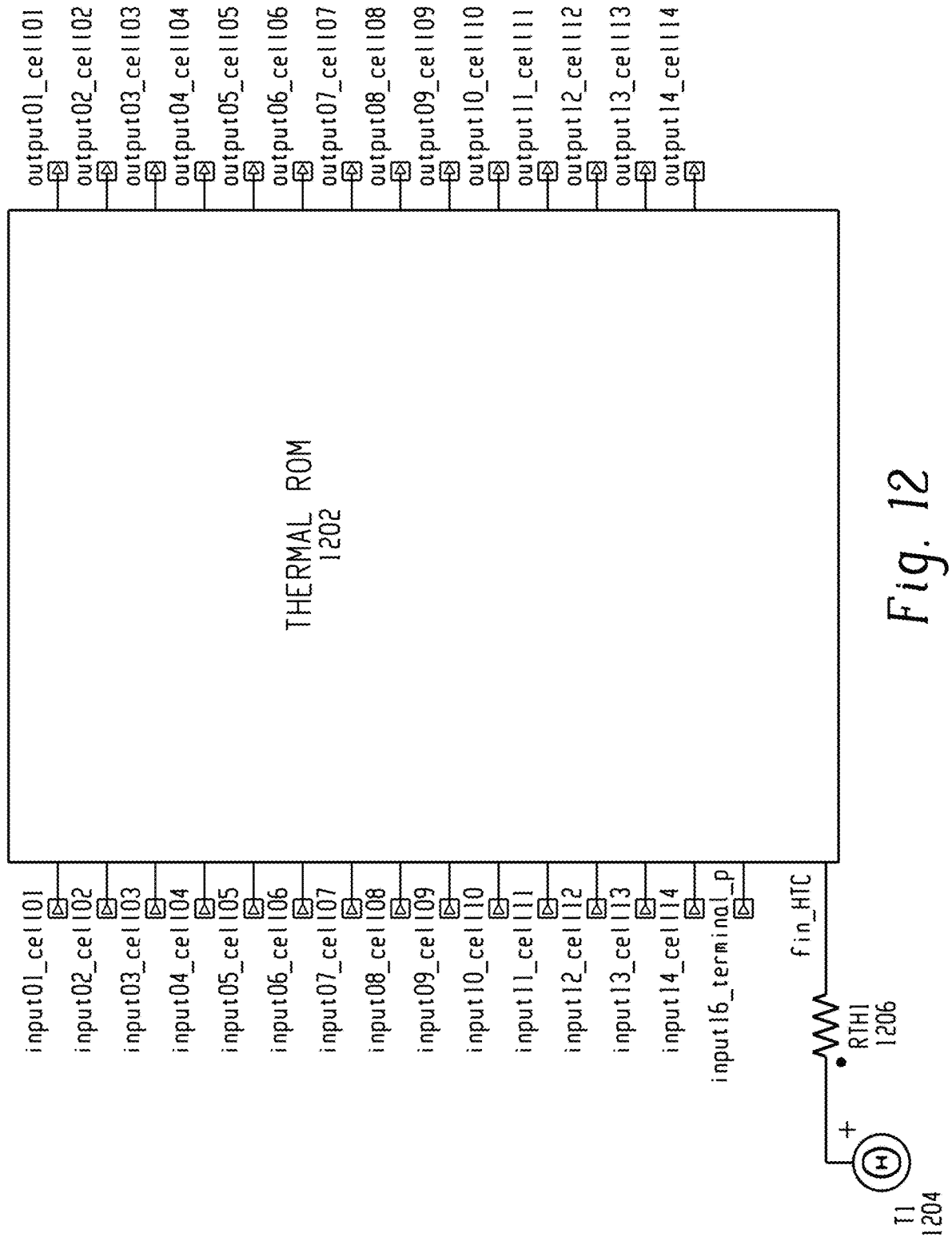
FIG. 12 is a diagram depicting an example thermal ROM having a coolant model connection pin.

As noted above, the coolant model is connected to thermal models associated with battery modules to simulate cooling. In embodiments the coolant model is connected to a thermal model by one conservative pin. FIG. 12 is a diagram depicting an example thermal ROM having a coolant model connection pin. The thermal ROM 1202 is configured to model a 14 battery cell battery module. The ROM 1202 includes 14 battery cell input pins (labeled input01_cell01 . . . input14_cell14), one input pin per battery cell. The ROM is configured to receive an input (e.g., a continuous heat generation input) on each of those pins indicative of heat generated by the corresponding battery cell due to heat dissipation. For example, input08_cell08 may receive a continuous signal indicative of heat generation at battery cell number 8 in generating electricity under current power demand and battery pack conditions in a current simulation. The ROM further includes 14 battery cell output pins (labeled output01_cell01 . . . output14_cell14), one output pin per battery cell. The ROM is configured to provide an output on each of those pins indicative of a temperature of the corresponding battery cell based on current and past heat inputs and battery module cooling as described in further detail below. For example, output08_cell08 may output a continuous signal indicative of current temperature at battery cell number 8. That temperature value may be based on the current and past heat generation input value at input08_cell08 and current and past heat generation at all other pins due to cross-heating. For example, the thermal ROM may consider the last M minutes of data at input08_cell08 (e.g., where M=30, 60, 90, 120 minutes), which may correspond to a time period beyond which heat inputs have no or less than a threshold amount of impact on battery cell temperature.

The thermal ROM is connected with the coolant inlet temperature through a conservative pin (or a port), which is essentially a pair of combined input/output pins, labeled fin_HTC modeling the interaction of the module and the cold plate. In the example of FIG. 12, the fin_HTC is connected with coolant temperature through a thermal resistor having an adjustable resistance value based on heat transfer coefficient values. Based on the communication of the fin_HTC pin and coolant inlet temperature, the thermal ROM adjusts heat/temperature values of its model. For example, when the interaction of fin_HTC and the coolant inlet temperature indicates an amount of cooling at X, the thermal ROM 1202 may downwardly adjust temperature levels associated with the battery cells of the battery module accordingly.

Figure 13:
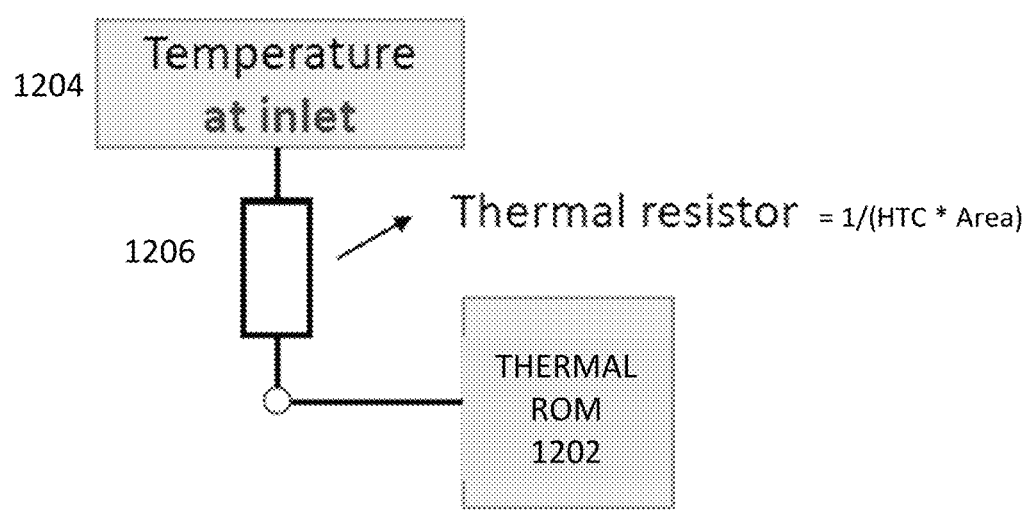
FIG. 13 is a diagram depicting example metrics based upon which a coolant model signal is provided to a thermal ROM.

FIG. 13 is a diagram depicting how the cold plate model is coupled with the battery module thermal ROM model. In the example, the signal at 1204 is based on the inlet coolant temperature, essentially the temperature of the air in which the vehicle is operating. The thermal resistor is used to simulate the interaction between the module and the coolant. The cold plate model provides the thermal resistance value, which is according to the relationship: R=1/(HTC*Cold Plate Area), where HTC is a heat transfer coefficient between the cold plate and the battery module associated with the thermal ROM 1202, and Area is based on a size area on which the battery module sits on the cold plate (e.g., a rectangular area (length*width) of the space on which the battery module sits on the cold plate). The Area remains constant through the simulation. In embodiments, the cold plate model adjusts the resistance value at 1206 based on the coolant flow rate. The HTC information, as a function of coolant flow rate, could be saved in a lookup table.

In embodiments, the cold plate model connection to the thermal model depicted at 1202 is implemented as a conservative input or a conservative port. A conservative pin is a combination of a pair of input and output pins. An input pin (e.g., heat input pin to the ROM) sends a signal into a model for the model to process to calculate an output, and an output pin (eg, the temperature pin from the ROM) sends an output from the model calculated from its inputs. A conservative pin (or port) is a combination of both. A boundary condition to a solver embedded in the model for simulating a physical system can be imposed via the conservative pin. For example, a conservative pin (or port) assures that the heat flow through the two components connected to the pin satisfies a conservation law. In examples herein, the use of conservative assures that the heat flow leaving a particular thermal ROM associated with a particular battery module, will all be received by the cold plate. This will assure that conservation of energy is satisfied.

Figure 14:
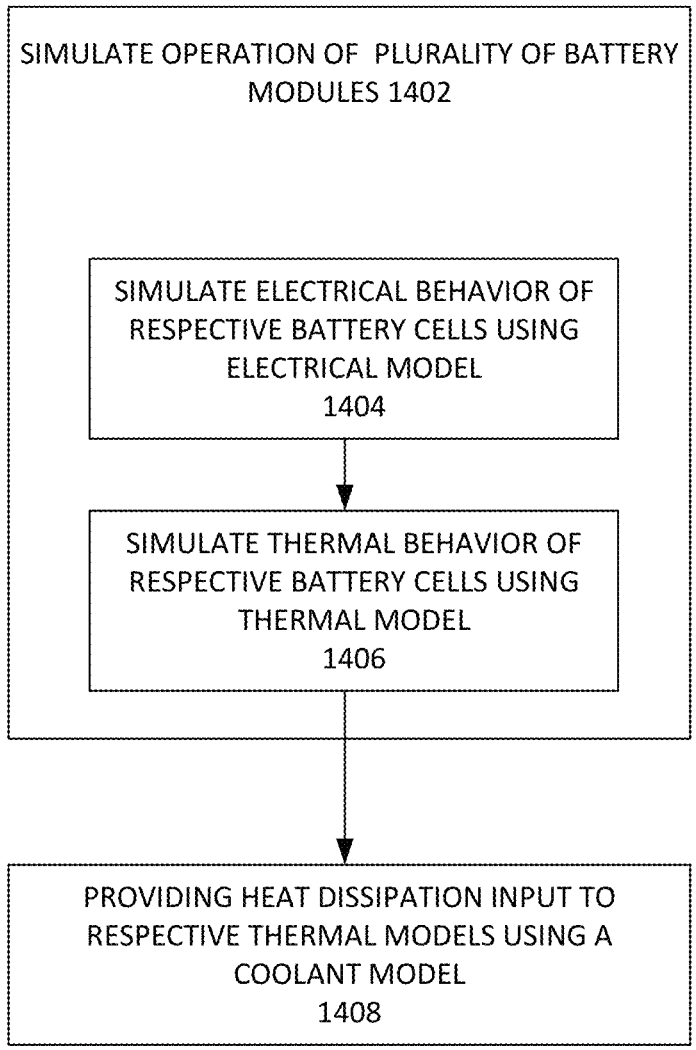
FIG. 14 is a flow diagram depicting a computer-implemented method of simulating operation of a battery pack comprising a plurality of battery modules, each battery module comprising a plurality of battery cells.

FIG. 14 is a flow diagram depicting a computer-implemented method of simulating operation of a battery pack comprising a plurality of battery modules, each battery module comprising a plurality of battery cells. At 1402, the method simulates operation of the plurality of battery modules. Simulating operation of a particular battery module includes, at 1404, simulating electrical behavior of respective battery cells of the battery module using an electrical model and simulating electrical behavior including providing outputs indicative of operation of respective battery cells of the battery module. At 1406, thermal behavior of respective battery cells of the battery model is simulated based on outputs of the electrical model using a thermal model, simulating thermal behavior including comprising providing outputs indicative of operation of respective battery cells of the battery module, where simulating electrical behavior is based on said outputs of the thermal model. At 1408, a heat dissipation input is provided to respective thermal models using a coolant model configured to simulate cooling of the battery modules based on a temperature and a heat transfer coefficient associated with respective battery modules.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

Figure 15A:
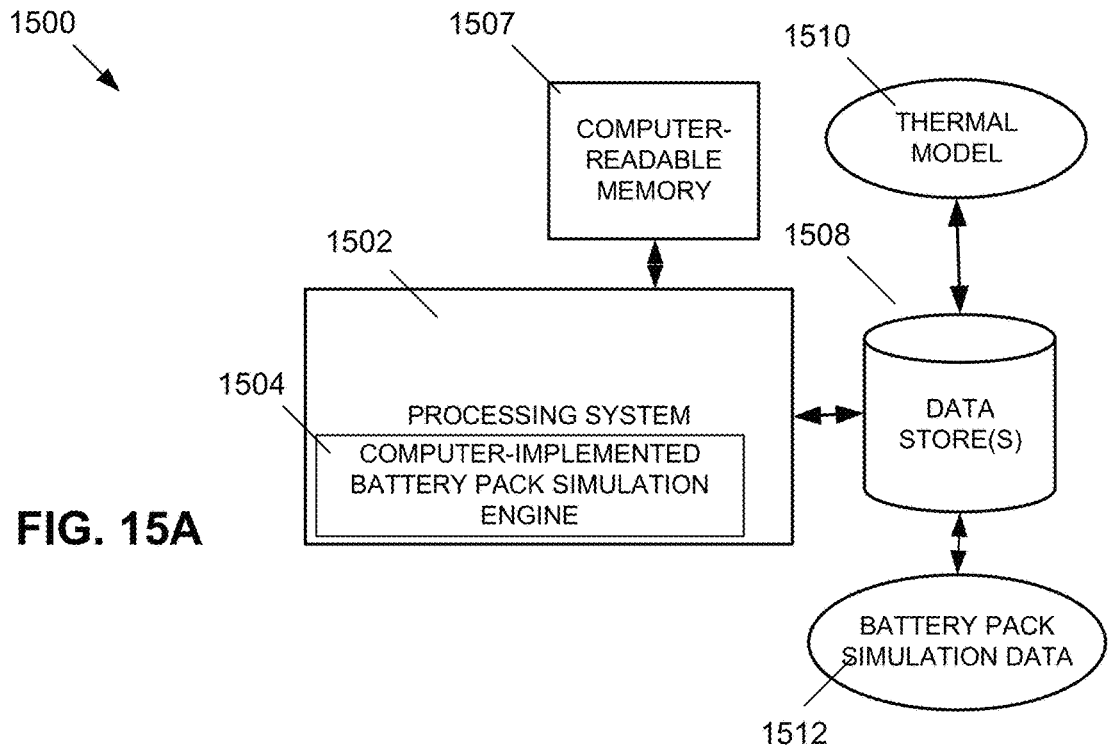
FIGS. 15A, 15B, and 15C depict example systems for implementing the approaches described herein for simulating battery pack operation.
Figure 15B:
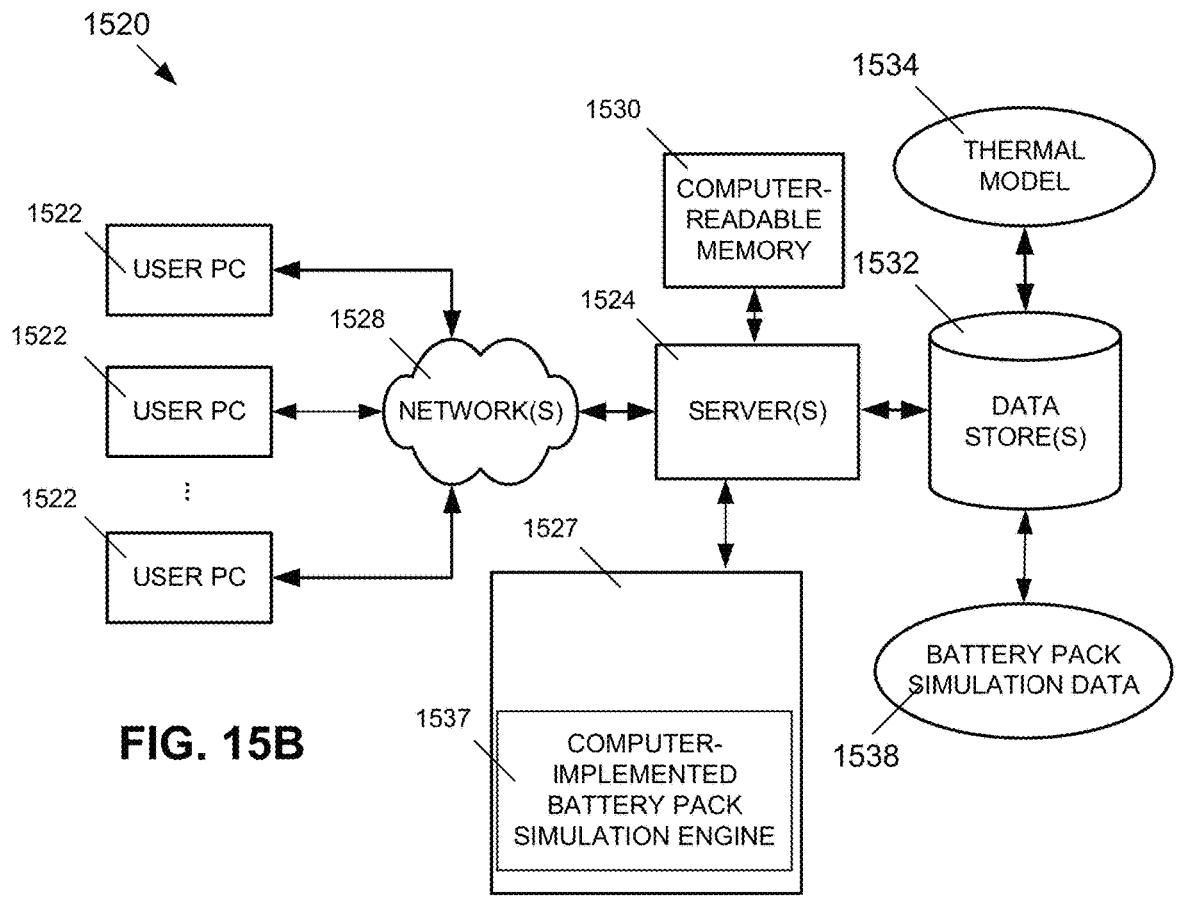
Figure 15C:
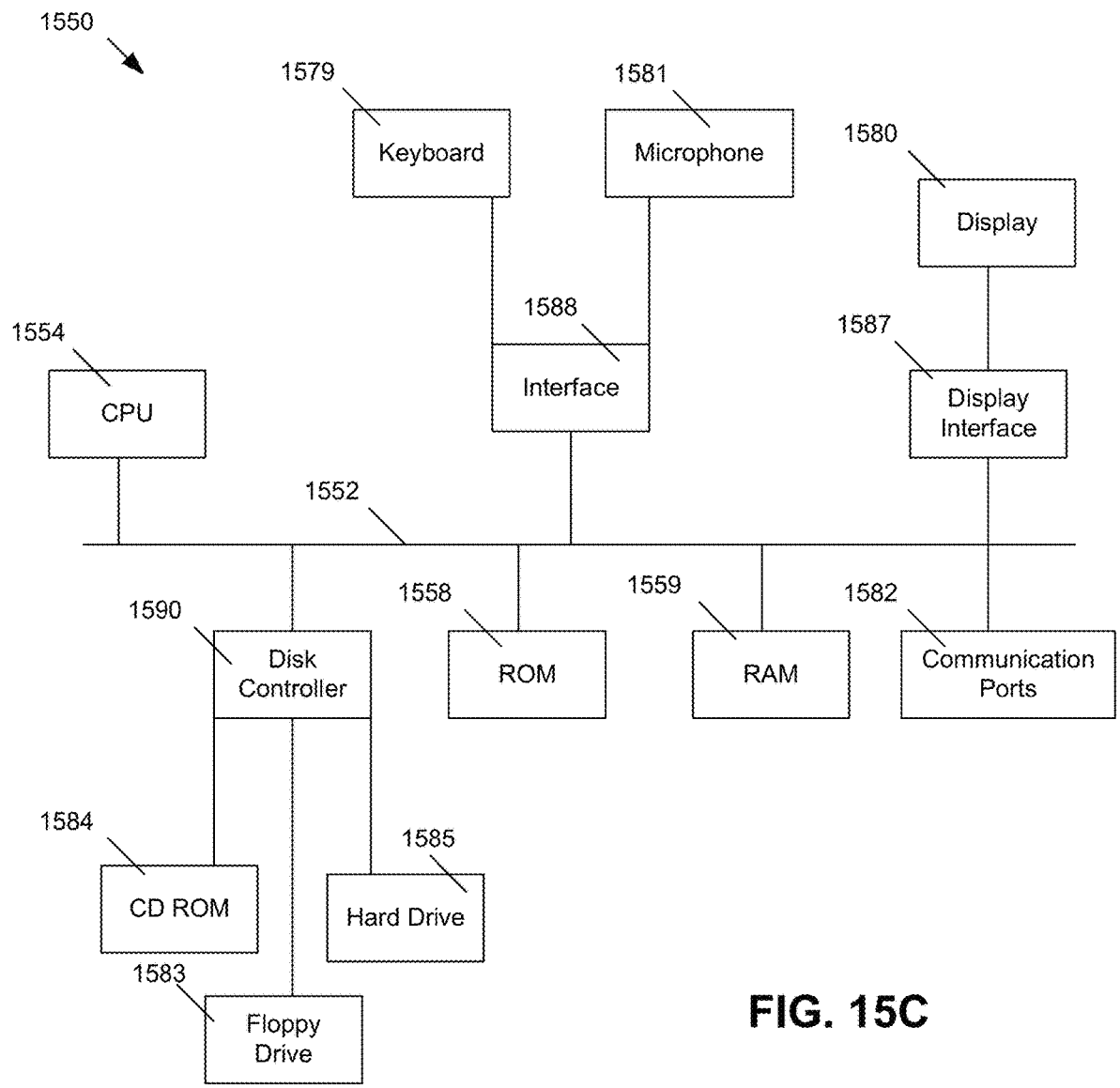

FIGS. 15A, 15B, and 15C depict example systems for implementing the approaches described herein for simulating battery pack operation. For example, FIG. 15A depicts an exemplary system 1500 that includes a standalone computer architecture where a processing system 1502 (e.g., one or more computer processors located in a given computer or in multiple computers that may be separate and distinct from one another) includes a computer-implemented battery pack simulation engine 1504 being executed on the processing system 1502. The processing system 1502 has access to a computer-readable memory 1507 in addition to one or more data stores 1508. The one or more data stores 1508 may include a thermal model 1510 as well as battery pack simulation data 1512. The processing system 1502 may be a distributed parallel computing environment, which may be used to handle very large-scale data sets.

FIG. 15B depicts a system 1520 that includes a client-server architecture. One or more user PCs 1522 access one or more servers 1524 a computer-implemented battery pack simulation engine 1537 on a processing system 1527 via one or more networks 1528. The one or more servers 1524 may access a computer-readable memory 1530 as well as one or more data stores 1532. The one or more data stores 1532 may include a thermal model 1534 as well as battery pack simulation data 1538.

FIG. 15C shows a block diagram of exemplary hardware for a standalone computer architecture 1550, such as the architecture depicted in FIG. 15A that may be used to include and/or implement the program instructions of system embodiments of the present disclosure. A bus 1552 may serve as the information highway interconnecting the other illustrated components of the hardware. A processing system 1554 labeled CPU (central processing unit) (e.g., one or more computer processors at a given computer or at multiple computers), may perform calculations and logic operations required to execute a program. A non-transitory processor-readable storage medium, such as read only memory (ROM) 1558 and random access memory (RAM) 1559, may be in communication with the processing system 1554 and may include one or more programming instructions for simulating operation of a battery pack. Optionally, program instructions may be stored on a non-transitory computer-readable storage medium such as a magnetic disk, optical disk, recordable memory device, flash memory, or other physical storage medium.

In FIGS. 15A, 15B, and 15C, computer readable memories 1507, 1530, 1558, 1559 or data stores 1508, 1532, 1583, 1584, 1588 may include one or more data structures for storing and associating various data used in the example systems. For example, a data structure stored in any of the aforementioned locations may be used to store data from XML files, initial parameters, and/or data for other variables described herein. A disk controller 1590 interfaces one or more optional disk drives to the system bus 1552. These disk drives may be external or internal floppy disk drives such as 1583, external or internal CD-ROM, CD-R, CD-RW or DVD drives such as 1584, or external or internal hard drives 1585. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1590, the ROM 1558 and/or the RAM 1559. The processor 1554 may access one or more components as required.

A display interface 1587 may permit information from the bus 1552 to be displayed on a display 1580 in audio, graphic, or alphanumeric format. Communication with external devices may optionally occur using various communication ports 1582.

In addition to these computer-type components, the hardware may also include data input devices, such as a keyboard 1579, or other input device 1581, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A method of simulating operation of a battery pack, the method comprising:
   performing thermal simulation of a battery module comprising a plurality of battery cells, the thermal simulation computing temperature values at a plurality of locations within respective battery cells of the battery module as thermal results;
   using the thermal results to generate a reduced order thermal model for the battery module, the reduced order thermal model comprising a state space model that provides temperature outputs associated with respective battery cells of the battery module based on past and current heat inputs associated with the respective battery cells; and
   simulating operation of the battery pack by operating respective thermal models and electrical models of the battery module and other battery modules, wherein outputs of the thermal model are connected to inputs of a particular electrical model, outputs of the particular electrical model are connected to inputs of the thermal model, and a coolant model is connected to inputs of the thermal model and other thermal models associated with the other battery modules.

2. The method of claim 1, wherein a particular electrical model is configured to simulate behavior of respective battery cells of the respective battery module, wherein a particular thermal model is configured to simulate thermal behavior of the respective battery cells of the respective battery module;
   wherein the particular electrical model provides outputs indicative of operation of the respective battery cells of the respective battery module that are coupled as inputs to the particular thermal model, wherein the particular thermal model provides outputs indicative of operation of the respective battery cells of the respective battery module coupled as inputs to the particular electrical model, and wherein the coolant model is configured to couple with the particular thermal model of the respective battery module and other thermal models associated with other battery modules.

3. The method of claim 1, wherein the particular thermal model includes a conservative pin associated with one input to the particular thermal model and one output provided by the particular thermal model, wherein the coolant model is configured to interact with the particular thermal model via the conservative pin.

4. The method of claim 2, wherein the coolant model provides an input to the particular thermal model indicating a simulated amount of heat removed from the respective battery module via a simulated cold plate that is represented by the coolant model.

5. The method of claim 4, wherein the input provided by the coolant model is based on temperature at an input of the simulated cold plate;
   wherein the input provided by the coolant model is augmented based on a simulated resistor, a resistance of the simulated resistor being based on the heat transfer coefficient associated with the respective battery module.

6. The method of claim 5, wherein the resistance is determined by accessing a look up table associated with the cold plate model, wherein battery modules of the battery pack have different values in the look up table.

7. The method of claim 5, wherein the resistance is further based on a flow rate of coolant associated with the simulated cold plate.

8. The method of claim 1, wherein the particular electrical model is configured to output a single heat output value for respective battery cells of the respective battery module at one time, those heat output values being routed to inputs of the particular thermal model.

9. The method of claim 1, wherein the system simulates operation of the battery pack in real time.

10. The method of claim 1, wherein the particular electrical model is an equivalent circuit model that determines a current heat output at a particular battery cell of the respective battery module based on a commanded output of the particular battery cell and a current temperature value associated with the particular battery cell received from the thermal model.

11. A computer-readable medium encoded with instructions for commanding one or more data processors to execute steps of a method of simulating operation of a battery pack, the method comprising:
   performing thermal simulation of a battery module comprising a plurality of battery cells, the thermal simulation computing temperature values at a plurality of locations within respective battery cells of the battery module as thermal results;
   using the thermal results to generate a reduced order thermal model for the battery module, the reduced order thermal model comprising a state space model that provides temperature outputs associated with respective battery cells of the battery module based on past and current heat inputs associated with the respective battery cells; and
   simulating operation of the battery pack by operating respective thermal models and electrical models of the battery module and other battery modules, wherein outputs of the thermal model are connected to inputs of a particular electrical model, outputs of the particular electrical model are connected to inputs of the thermal model, and a coolant model is connected to inputs of the thermal model and other thermal models associated with the other battery modules.

12. The computer-readable medium of claim 11, wherein a particular electrical model is configured to simulate behavior of respective battery cells of the respective battery module, wherein a particular thermal model is configured to simulate thermal behavior of the respective battery cells of the respective battery module;

wherein the particular electrical model provides outputs indicative of operation of the respective battery cells of the respective battery module that are coupled as inputs to the particular thermal model, wherein the particular thermal model provides outputs indicative of operation of the respective battery cells of the respective battery module coupled as inputs to the particular electrical model, and wherein the coolant model is configured to couple with the particular thermal model of the respective battery module and other thermal models associated with other battery modules.

13. The computer-readable medium of claim 11, wherein the particular thermal model includes a conservative pin associated with one input to the particular thermal model and one output provided by the particular thermal model, wherein the coolant model is configured to interact with the particular thermal model via the conservative pin.

14. The computer-readable medium of claim 12, wherein the coolant model provides an input to the particular thermal model indicating a simulated amount of heat removed from the respective battery module via a simulated cold plate that is represented by the coolant model.

15. The computer-readable medium of claim 14, wherein the input provided by the coolant model is based on temperature at an input of the simulated cold plate;

wherein the input provided by the coolant model is augmented based on a simulated resistor, a resistance of the simulated resistor being based on the heat transfer coefficient associated with the respective battery module.

16. The computer-readable medium of claim 15, wherein the resistance is determined by accessing a look up table associated with the cold plate model, wherein battery modules of the battery pack have different values in the look up table.

17. The computer-readable medium of claim 15, wherein the resistance is further based on a flow rate of coolant associated with the simulated cold plate.

18. The computer-readable medium of claim 11, wherein the particular electrical model is configured to output a single heat output value for respective battery cells of the respective battery module at one time, those heat output values being routed to inputs of the particular thermal model.

19. The computer-readable medium of claim 11, wherein the system simulates operation of the battery pack in real time.

20. The computer-readable medium of claim 11, wherein the particular electrical model is an equivalent circuit model that determines a current heat output at a particular battery cell of the respective battery module based on a commanded output of the particular battery cell and a current temperature value associated with the particular battery cell received from the thermal model.

* * * * *